Figure 2:
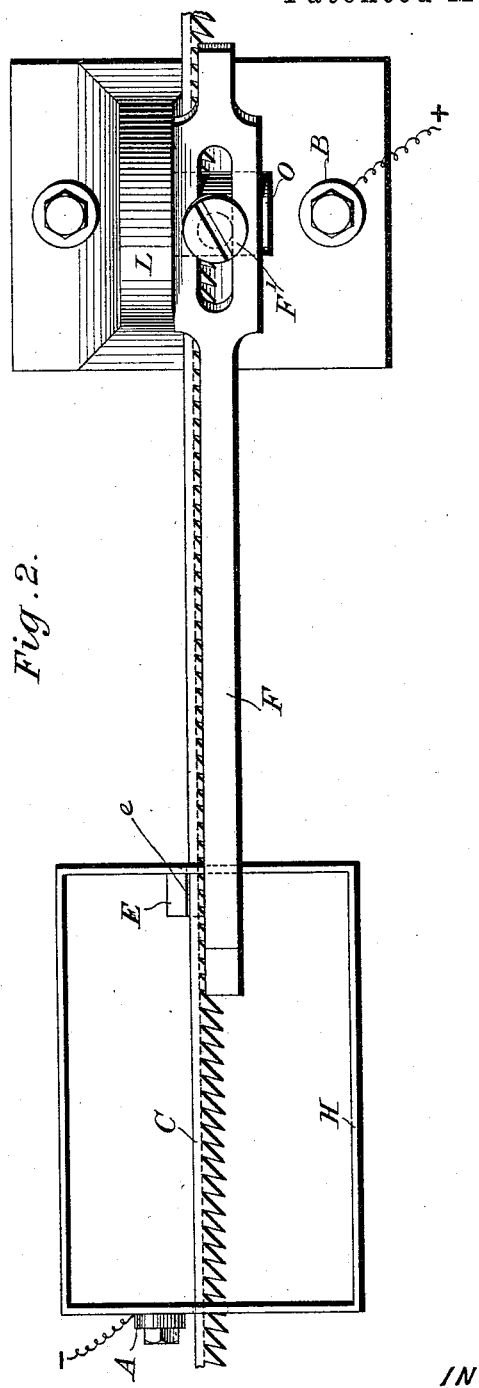

(No Model.)  2 Sheets—Sheet 1.
J. PLATT.
PROCESS OF AND APPARATUS FOR HARDENING POINTS OF SERRATED OR SAW TOOTH WIRE.
No. 538,979.  Patented May 7, 1895.
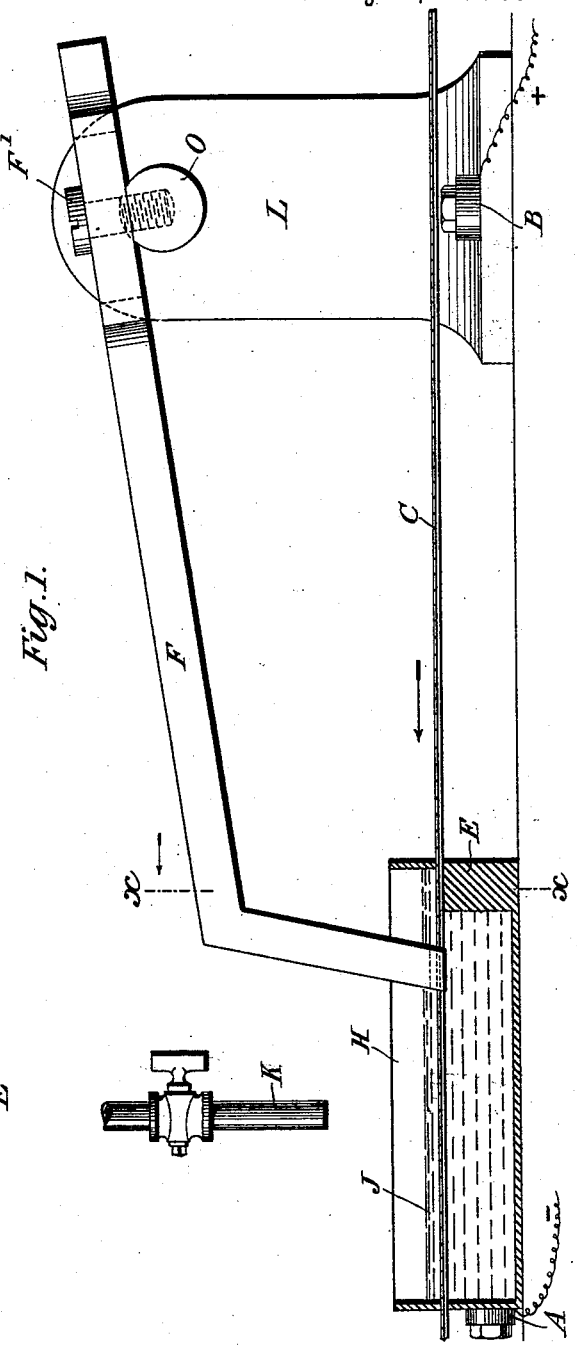
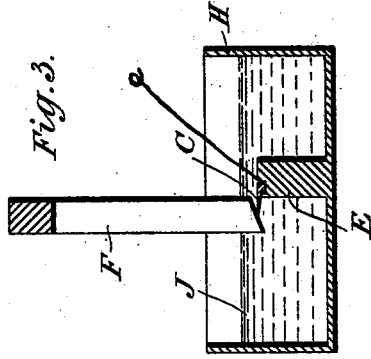
WITNESSES
J. T. Howard
Gervase Appleyard
INVENTOR.
John Platt.

(No Model.) 2 Sheets—Sheet 2.

J. PLATT.
PROCESS OF AND APPARATUS FOR HARDENING POINTS OF SERRATED OR SAW TOOTH WIRE.

No. 538,979. Patented May 7, 1895.

WITNESSES
J. S. Howard
Gervase Appleyard

INVENTOR.
John Platt

UNITED STATES PATENT OFFICE.

JOHN PLATT, OF CLECKHEATON, ENGLAND.

PROCESS OF AND APPARATUS FOR HARDENING POINTS OF SERRATED OR SAW-TOOTH WIRE.

SPECIFICATION forming part of Letters Patent No. 538,979, dated May 7, 1895.

Application filed January 28, 1895. Serial No. 536,485. (No model.)

*To all whom it may concern:*

Be it known that I, JOHN PLATT, a subject of Her Majesty the Queen of Great Britain, residing at Cleckheaton, in the county of York, England, have invented a certain new and useful Process of and Apparatus for Hardening the Points of Serrated or Saw-Tooth Wire, of which the following is a specification.

This invention relates to an improved process of and apparatus for hardening the points or teeth of serrated or saw tooth wire of the class known as "Garnett" wire the hardening being effected by means of the electric current which is applied in such a manner that the points only of the teeth are hardened and not the rib of same.

A convenient apparatus for carrying the process into effect is illustrated in the accompanying drawings, in which—

Figure 1 is a side elevation of an apparatus suitable for the purpose, part being in section. Fig. 2 is a plan of same. Fig. 3 is a section of Fig. 1 on line $x\,x$. Fig. 4 is a plan of the under surface of the wire, and Fig. 5 is an end section of same.

The operation consists in heating the points of the wire to such a degree as will cause them to harden when quenched in a suitable cooling medium, the rib and thicker portion or root of the tooth remaining practically cold not being affected or hardened.

The operation is effected by bringing one terminal or pole of a source of electricity into contact with the rib or thick part of the wire, and the other terminal or pole in contact with a tooth or teeth so that the circuit is closed or completed. A current of electricity of sufficient intensity to raise the temperature of the point of the tooth to a red heat will leave the base of the tooth and rib comparatively cool. The wire being steel will harden at the point when suddenly cooled thereby insuring greater durability and the rib will remain soft, thus allowing it to be wrapped or coiled around the cylinder as required.

The operation of the apparatus is as follows:—The wire C is unrolled from a reel or bobbin and passes through a trough H containing a suitable cooling medium, preferably oil, the wire being threaded through small slots or holes in the ends of the trough. The trough which is metallic is connected with terminal A and constitutes one pole and the serrated wire comes in contact with it on the block E which is grooved as at $e$ to the gage of the rib of the wire as shown in Fig. 3. An arm F adjustably held by means of a screw F' to a stud O which forms an axis secured on the upright L, constitutes the second pole through terminal B connected with it. The rib of the wire as it travels along is constantly in contact with the block E which is one pole and the points of the wire successively touch the end of the arm F which is slightly beveled at its extremity (Fig. 3) so as to touch the points of the teeth only. This heating operation is carried on beneath the level of the cooling medium; that is to say, the points become red hot despite the fact that the wire is surrounded by oil or water or other cooling medium of low conducting power.

The process has several advantages.

As the wire travels along and leaves the electric circuit which exists between E and F the cooling medium chills it instantly thus preventing the radiation of the heat, which is very rapid, from the point to the rib.

The liquid cooling medium prevents the disruptive sparks which are caused by the extra current (as each point breaks contact with arm F), from burning and drilling the points and also from rapidly deteriorating the extremity of the arm by contact with the points which have a tendency to "weld" to the arm F when the operation is carried on in the open air but which points leave the arm quite freely when under the cooling medium.

The level of the medium J is kept up by the feed pipe K.

I am aware that machines are actually in use by means of which the points of "Garnett" serrated wire are hardened after being heated by means of a flame but this process is both costly and unsatisfactory owing to the difficulty of heating the points to a hardening heat without at the same time heating the rib and rendering it brittle when cooled. The section of the wire is however such that by the electrical process the point must be hot while the rib remains cool.

What I claim is—

1. The process of hardening the points of serrated or saw tooth wire which consists in subjecting the points of the teeth of same to the heating action of an electric current while the wire is surrounded by a liquid cooling medium so that the points only of the wire are hardened substantially as and for the purpose set forth.

2. In an apparatus for hardening the points of serrated or saw tooth wire the combination of a trough, a liquid cooling medium therein, a block in the trough below the surface of the liquid, said block forming one pole of an electric circuit, means for holding the wire on the block, an arm forming the other pole, the end of said arm being arranged to touch the points of the teeth only, and means for carrying the arm substantially as described.

In testimony whereof I have hereunto set my hand in the presence of two subscribing witnesses.

JOHN PLATT.

Witnesses:
J. B. HOWARD,
GERVASE APPLEYARD.